Jan. 19, 1932.  K. C. RANDALL  1,842,201
TRUCK CIRCUIT BREAKER
Filed July 6, 1923   3 Sheets-Sheet 3
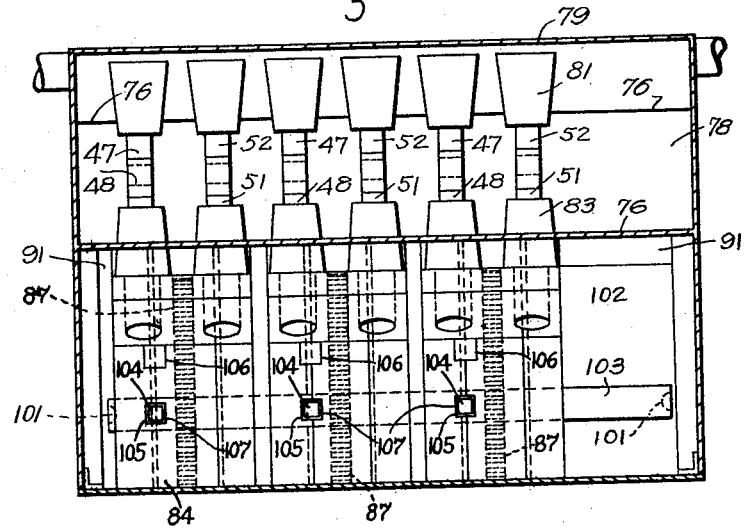
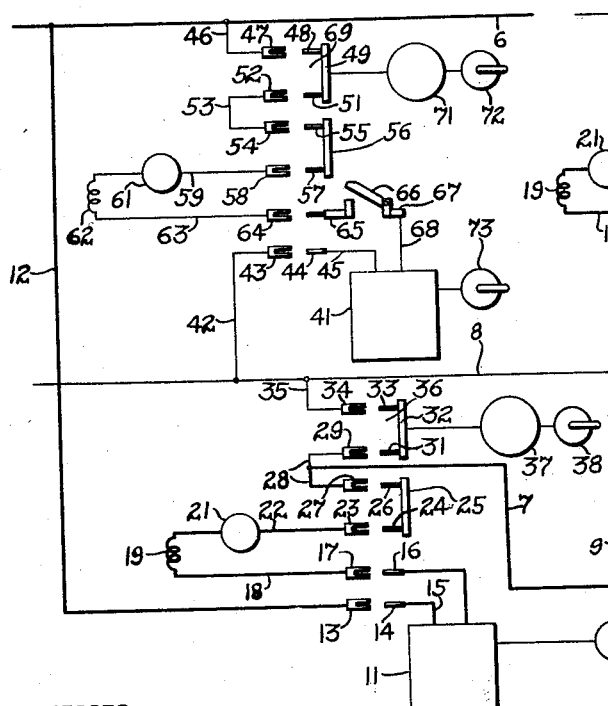
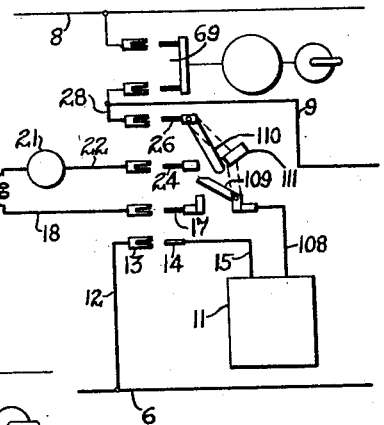
WITNESSES:
INVENTOR
Karl C. Randall.
BY
ATTORNEY Patented Jan. 19, 1932

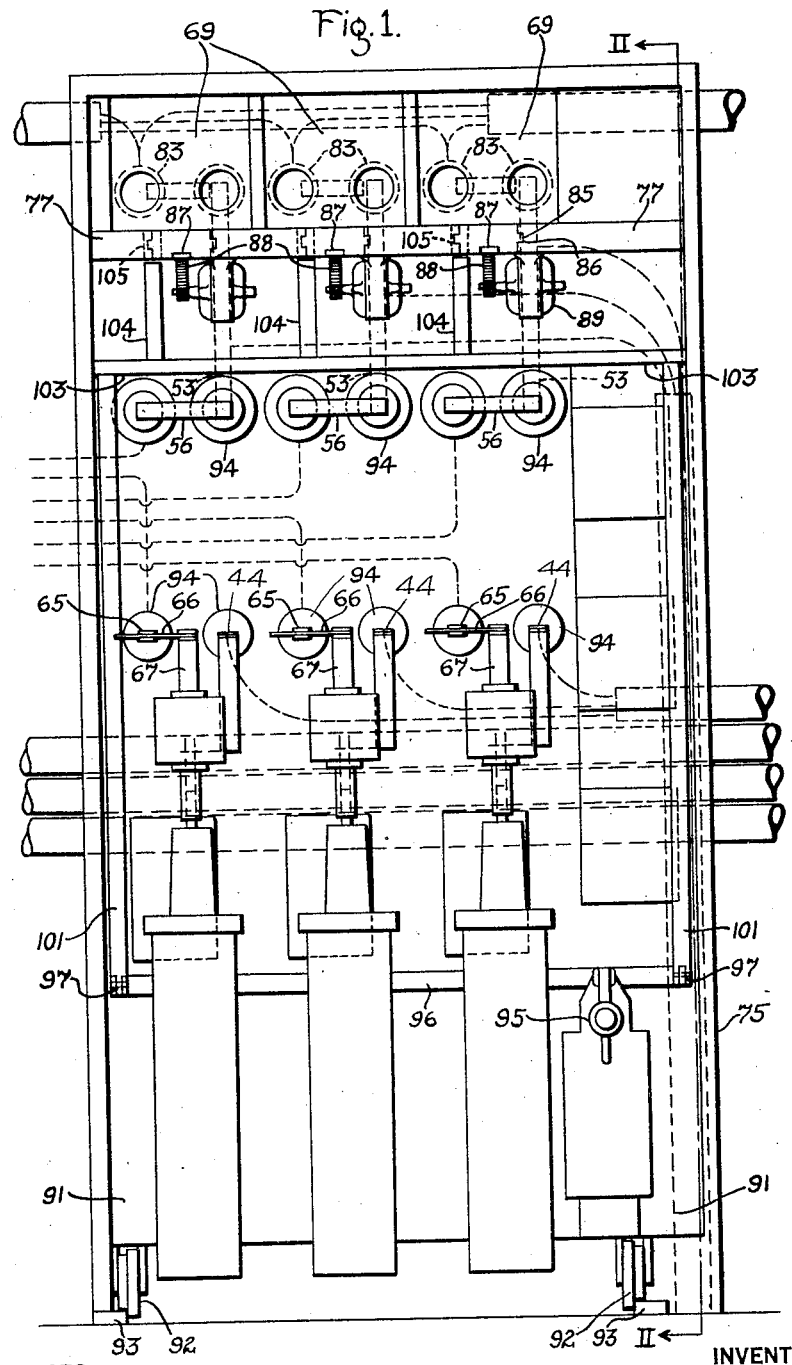

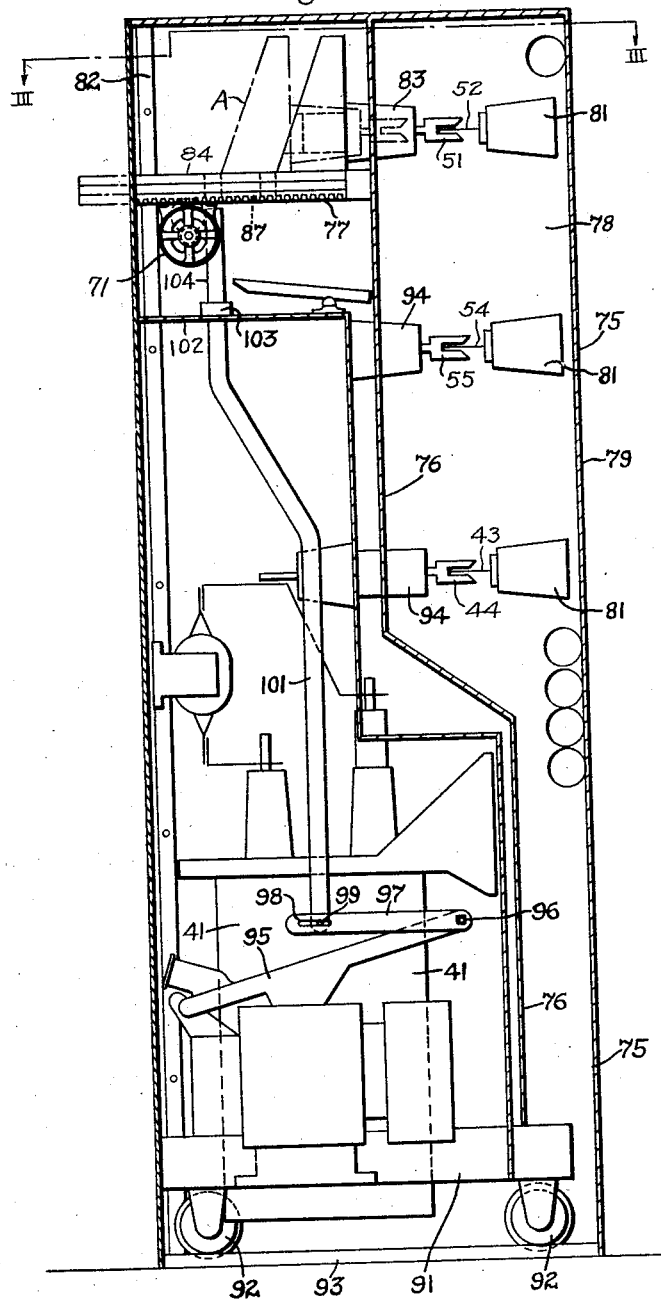

1,842,201

UNITED STATES PATENT OFFICE

KARL C. RANDALL, OF EDGEWOOD PARK, PENNSYLVANIA, ASSIGNOR TO WESTINGHOUSE ELECTRIC & MANUFACTURING COMPANY, A CORPORATION OF PENNSYLVANIA

TRUCK CIRCUIT BREAKER

Application filed July 6, 1923. Serial No. 649,864.

My invention relates to circuit controlling apparatus and particularly to circuit breaker apparatus for controlling polyphase power distributing circuits.

In certain polyphase power distributing systems, it has been customary to provide means for controlling the current to separate feeders from main supply busses. In a four-conductor three-phase system, it has been necessary, in order to disconnect any particular phase from a feeder, to provide a separately-operable single-pole circuit breaker and a separately-operable motor-actuated remotely-controlled disconnecting switch for each phase of the circuit. By reason of such an arrangement, when a phase circuit became defective, it could be eliminated from the feeder circuit by opening the single-pole circuit breaker connected therein and subsequently opening the disconnecting switch.

In large installations employing a great number of circuit breakers, the multiplicity of actuating devices for the single-pole circuit breaker and separately-operable disconnecting switches considerably increases the cost of the installation over an installation employing three-pole interlocked circuit breakers actuated by a single operating means and three-pole interlocked disconnecting switches actuated by a single remotely controlled motor. However, a certain phase of the circuit can not be eliminated from the feeder circuit by means of a three-pole interlocked circuit breaker and a three-pole interlocked disconnecting switch and, when one phase becomes defective, it is necessary to disconnect every phase of the circuit from the feeder, thus necessitating a shutdown of the apparatus supplied by the feeder.

One object of my invention is to provide a circuit breaker system with an auxiliary circuit breaker that may be connected with the feeder circuit and substituted for any circuit breaker having a disordered circuit and to provide such auxiliary circuit breaker with means whereby the defective phase circuit may be disconnected from the feeder circuit while permitting operation of the remaining phase circuits.

Another object of my invention is to provide an auxiliary circuit breaker apparatus having the above characteristics wherein a relatively inexpensive three-pole circuit breaker is provided with three separately-operable and remotely-controlled disconnecting switches whereby the defective phase circuit may be maintained in open condition while the other phase circuits are operative.

Another object of my invention is to provide an auxiliary circuit breaker of the truck panel type wherein the disconnecting switches are mounted in a separate compartment in the cell containing the truck which carries the circuit breaker and wherein the disconnecting switches are so interlocked with the circuit breaker that the latter cannot be actuated to open or to closed position, except when the disconnecting switches are in either fully-open position or fully-closed position.

Another object of my invention is to provide a circuit breaker of the truck panel type having separately operable disconnecting switches, one for each phase, that are mounted in the truck cell and wherein the truck is so interlocked with the cell and the disconnecting switches that the truck cannot be withdrawn from the cell so long as the circuit breaker is in closed position and the circuit breaker cannot be opened or closed except when the disconnecting switches are in predetermined positions.

Another object of my invention is to provide a circuit breaker of the truck panel type wherein the truck carrying the circuit breaker is provided with disconnecting switches operating independently of one another and of the circuit breaker, for isolating certain contacts carried by the truck or for isolating, while the truck is in closed position, certain circuits that are normally closed when the truck is in closed position with respect to the cell.

Another object of my invention is to provide an auxiliary polyphase interlocked circuit breaker which may be substituted for a polyphase interlocked circuit breaker and which is provided with means whereby any predetermined phase may be selectively eliminated from the feeder circuit.

These and other objects, that will be made apparent throughout the further description of my invention, are attained by means of the apparatus herein described, and illustrated in the accompanying drawings, wherein Figure 1 is a front elevational view of the auxiliary circuit breaker apparatus with the front closure plate thereof removed;

Fig. 2 is a longitudinal section through the apparatus taken on the line II—II of Fig. 1;

Fig. 3 is a transverse section through the apparatus taken on the line III—III of Fig. 2 showing closure plate applied;

Fig. 4 is a wiring diagram showing a single phase of a four-conductor, three-phase circuit control system embodying the circuit breaker apparatus, and Fig. 5 is a diagram showing a modified arrangement of circuit breaker elements and connections.

Referring first to Fig. 4 which illustrates a single phase of a three-phase current distributing system, the system includes a main supply bus 6, a feeder bus 7 and a transfer bus 8. It will be understood that similar busses are provided for each phase of the circuits and that the return conductor 9 is common to all phases and is not provided with any circuit controlling means. The main circuit breaker 11 is connected to the main bus through the conductor 12, contact member 13, contact member 14 and conductor 15. The other side of the circuit breaker 11 is connected to the feeder 7 through contact members 16 and 17, conductor 18, reactor 19, regulator 21, conductor 22, contact members 23 and 24, bridging conductor 25, contact members 26 and 27 and conductor 28.

The feeder 7 is connected to the transfer bus 8 through the conductor 28, contact members 29 and 31, bridging conductor 32, contact members 33 and 34 and conductor 35. It will be understood that the contact members 34 and 29, which constitute the stationary contact members of the bridging switch 36, are mounted in the cell structure of the circuit breaker apparatus and the contact members 33 and 31 are mounted on the movable bridging conductor 32 that is actuated by a motor 37 controlled by controller switch 38. The contact members 27, 23, 17 and 13 are stationarily mounted upon the cell structure to be hereinafter described while the contact members 26, 24, 16 and 14, which respectively engage the previously mentioned contact members, are mounted on the truck which carries the circuit breaker 11 and are withdrawn from engagement from their respective contact members when the truck is withdrawn from the cell.

It will be understood that the motor 37 for actuating the disconnecting switch 36 is connected to the switch for each phase of the circuit and, therefore, the disconnecting switches are actuated simultaneously. It will also be understood that the actuating mechanism of the circuit breaker is connected to the three circuit breakers constituting the polyphase breaker and consequently the breakers for each phase are actuated simultaneously. Hereinafter a polyphase circuit breaker wherein the breakers for each phase are actuated simultaneously will be referred to as a polyphase interlocked circuit breaker and the disconnecting switch above described will be hereinafter referred to as a polyphase interlocked disconnecting switch.

The auxiliary circuit breaker 41 is connected to the transfer bus 8 through a conductor 42, contact members 43 and 44 and conductor 45. The circuit breaker 41 is connected to the main bus 6 through a conductor 46, contact members 47 and 48, a bridging conductor 49, contact members 51 and 52, conductor 53, contact members 54 and 55, bridging conductor 56, contact members 57 and 58, conductor 59, regulator 61, reactor 62, conductor 63, contact members 64 and 65, bridging switch 66, switch pivot jaw 67 and conductor 68. Contact members 47 and 52 are mounted in the cell structure to be hereinafter described and are adapted to engage contact members 48 and 51, which constitute a bridging switch 69. The disconnecting switch 69 differs from the disconnecting switch 36 in that the switch for each separate phase is independently operated by a separate motor 71 that is controlled by a separate remote controlling switch 72. The circuit breaker 41, however, is of the polyphase interlocked type wherein all poles are actuated simultaneously. The circuit breakers 41 and 11 are actuated by the usual electromagnetic mechanism controlled by remote controlling switches 73 and 74 respectively.

During the normal operation, current flows from the main bus 6 through the circuit breaker 11, by means of the various contact members and switches previously described, to the feeder 7. During the normal operation of the circuit breaker 11, the disconnecting switch 36 is maintained in open position and the circuit breaker 41 and disconnecting switch 69 are also maintained in open position. Should a defective phase develop in the circuits controlled by the circuit breaker 11 the circuit breaker is first opened and the disconnecting switch 36 subsequently closed, thus connecting the feeder bus 7 to the transfer bus 8 and opening the circuit through the circuit breaker 11.

Should it be desirable to continue operation of the apparatus normally connected to the circuit breaker 11 with the two remaining phase circuits the respective disconnecting switches 69 included in the phase circuits to be retained are closed by their respective motors 71, the disconnecting switch 69 connected to the defective phase circuit being maintained in open position. It will be understood that under normal operating conditions, the disconnecting switch 66 of each phase remains in closed position.

When the disconnecting switches 69 are in the position just described, the circuit breaker 41 may be moved to closed position, thus establishing a circuit between the main bus 6 and the feeder 8 through the closed disconnecting switches 69 and the circuit breaker 41, and the disconnecting switches 36 in the cell containing the circuit breaker 11. If the defective phase condition was caused by apparatus connected in the circuit controlled by the circuit breaker 11, it may be repaired with safety for the reason that the circuit breaker and apparatus related thereto is disconnected from the system.

The construction of the circuit breaker mechanism of the auxiliary circuit breaker is shown in Figs. 1, 2 and 3, and comprises a metal cell or housing 75 which is divided into three compartments by a vertical partition 76 and a switch-supporting partition 77 mounted near the top of the cell. The stationary contact members 47, 52, 54, 58, 64 and 43 are mounted in the rear compartment 78 and preferably arranged in pairs in three separate rows and secured to the rear wall 79 of the cell by means of insulating bushings 81. It will be understood however, that the contacts may be arranged in any convenient manner to suit operating conditions.

The disconnecting switch 69 which carries the switch contacts 48 and 51 is mounted in the upper compartment 82. The contact members 48 and 51 are mounted in insulating bushings 83 that are mounted upon a movable support guide member 84, having tongues 85 that slidably engage guide grooves 86 in the partition wall 77 (Fig. 1). The under side of the support member 84 is provided with a rack 87 which is engaged by a pinion 88 that is geared to the reversible motor 71. The motor therefore serves to reciprocate the support member and switch members associated therewith into and out of engagement with the contact members 47 and 52.

The contact members 55, 57, 65 and 44 are mounted upon the truck 91, which is of well-known type and which is adapted to move into and out of the cell upon rollers 92 that rest upon a track rail 93 in the bottom of the cell. The circuit breaker 41 is connected to the contact member 65 by means of a disconnecting or bridging switch 66 as indicated in the diagram shown in Fig. 4 and in Fig. 1. The contact members 55, 57, 65 and 44 are mounted upon insulating bushings 94 that are secured to the truck frame in any preferred manner.

When the truck is moved out of the cell, contact members 55, 57, 65 and 44 are disengaged from their respective stationary contact members 54, 58, 64 and 43. By referring to Fig. 4, it will be seen that, when the truck is removed from the cell, reactors and regulators are disconnected from any live conductors and may be inspected or repaired without danger. However, the reactors and regulators of any phase may be disconnected from the circuit while the truck is in closed position by opening the bridging switch 66 of the phase circuit to be disconnected. The regulators and reactors of one phase therefore may be inspected and repaired while the remaining phase circuits are closed.

In order to prevent withdrawal of the truck from the cell, except when bridging switches 69 are in extreme open or closed positions, an interlocking device is provided between the circuit breaker and the said disconnecting switches. The operating lever 95 of the circuit breaker is connected at one end to a rotatable shaft 96 that extends across the truck and is provided at each end with a lever 97 having a slot 98 therein, for receiving a pin 99 carried on the lower end of an interlocking bar 101. The upper end of the interlocking bar extends through and is guided by the upper wall 102 of the truck. A cross bar 103 disposed directly above the top wall of the truck connects the interlocking bars 101 on opposite sides of the truck and the bar is provided with three locking pins 104 that are disposed directly beneath notches 105 provided in the partition 77. Each support member 84 is provided with two notches 106 and 107, as shown in Fig. 3, the latter being adapted to register with the notch 105 when the contacts of the disconnecting switch are in engagement with the stationary contacts 47 and 52, while the notch 106 is adapted to register with the notch 105 when the disconnecting switch 69 is in the open position A indicated by dotted lines in Fig. 2.

As illustrated in Fig. 2, the circuit breaker is in open position and the end of the pins 104 lie directly beneath the partition 77 and in registry with the notches 105 and 107 in the partition wall and support member respectively.

In order to close the circuit breaker the lever 95 is raised or rotated in a clockwise direction. This operation causes the pins 104 to enter the notches 105 and 107 and prevent any actuation of the disconnecting switches 69 so long as the circuit breaker is in closed position. The engagement of pins 104 with the notches 105 in the partition wall 77 prevents disengaging movement of the truck so long as the circuit breaker is in closed position. Should it be desired to operate on two phase circuits, one of the disconnecting switches 69 is moved to open position after the circuit breaker has been moved to open position.

When the selected disconnecting switch has been moved to fully-open position, the notch 106 in the guide member thereof will register with notch 105 and permit closing movement of the circuit breaker. However, the circuit breaker cannot be moved to closed position while the disconnecting switch is in any other than fully-open or fully-closed position, or only when the slots 106 and 107 are in proper registry with the pins 104. It will be seen therefore that the interlocking bar 101 serves both to prevent withdrawal of the truck from the cell when the circuit breaker is closed and to prevent closing movement of the circuit breaker except when the disconnecting switches are in fully-open or in fully-closed position.

While the operating mechanism for the circuit breaker is not shown or described in detail, it will be understood that the circuit breaker is of the three-pole interlocked type wherein all poles thereof are automatically actuated simultaneously to open the circuit when abnormal conditions prevail in any phase thereof. It will also be understood that the disconnecting switches 69 are actuated by separately operable motors 89 that are controlled from a remote point. The disconnecting switches however, may be operated manually if desired and the circuit breaker is of such construction as to permit of manual operation. No attempt is made herein to describe in detail the construction of the cell or truck as such construction is well-known in the art.

Referring to Fig. 5 a modified arrangement of switch elements is shown wherein two disconnecting switches, one on each side of the contact members associated with the reactor and regulator circuit, are provided on the truck. This arrangement is particularly adapted for the main circuit breakers wherein the circuit breakers and the disconnecting switches are of the three-pole interlocked type. In this arrangement, current in each phase circuit flows from the main bus 6 through a conductor 12, contact members 13 and 14, conductor 15, circuit breaker 11, conductor 108, disconnecting switch blade 109, contact member 17, conductor 18, reactor 19, regulator 21, conductor 22, contact member 24, switch blade 110, contact 26, conductor 28 to the feeder 9. As in the previous case, the disconnecting switches 69 connect the feeder with the transfer bus 8.

With this arrangement of switch elements, it is possible to disconnect any phase circuit from the system, even though the disconnecting switch 69 and the circuit breaker 11 are in closed position, by opening the disconnecting switch blades 109 or 110. When both disconnecting switches 109 and 110 are open, as indicated in full lines, the reactors and regulators are disconnected and may be inspected or repaired with safety. It will be understood that the disconnecting switches 109 and 110 are mounted on the truck and constitute an inexpensive means for permitting partial operation of a polyphase system while a polyphase interlocked circuit breaker and polyphase interlocked disconnecting switch are in closed position.

Service in a phase circuit may be maintained while the reactance and regulator are disconnected from the circuit by moving the switch blades 109 and 110 into engagement with a common switch jaw 111 as indicated in dotted lines in Fig. 5. It will be understood that the switch jaw 111 is carried upon the truck.

While I have illustrated and described but two embodiments of my invention it will be apparent to those skilled in the art that various changes, modifications, substitutions, additions and omissions may be made in the apparatus illustrated without departing from the spirit and scope of my invention as set forth in the appended claims.

I claim as my invention:

1. The combination with a support having a plurality of contact members thereon and a truck structure having a circuit breaker and contact members for engaging the first contact members for establishing a circuit through the circuit breaker, of a conductor mounted on the support for connecting at least two of the first contact members and a bridging conductor carried on the truck structure for connecting at least two of the second contact members.

2. The combination with a support having a plurality of contact members thereon and a truck structure having a circuit breaker and contact members for engaging the first contact members for establishing a circuit through the circuit breakers, of a plurality of bridging switches carried on the truck for connecting different second contact members whereby a portion of the said circuit connected to the first contact members may be isolated while the said first and second contact members are in engagement.

3. The combination with a support having a plurality of contact members thereon and a truck structure for having a circuit breaker and contact members for engaging the first contact members for establishing a circuit through the circuit breaker, of a bridging switch mounted on the support for connecting at least two of the first contact members, a plurality of bridging switches carried on the truck for connecting different second contact members whereby a portion of the said circuit connected to the first contact members may be isolated while the first and second contact members are in engagement.

4. The combination with a truck actuated polyphase interlocked circuit breaker having contacts thereon, and a support having a separately operable disconnecting switch for each phase and contacts on the support cooperating with those on the circuit breaker for establishing circuits through the circuit breaker, of means for so interlocking the circuit breaker with the support and the disconnecting switches that withdrawal of the circuit breaker from the support is precluded so long as the circuit breaker is closed and actuation of the circuit breaker is prevented except when all of the disconnecting switches are in their extreme operating positions.

5. Circuit breaker mechanism comprising a cell structure, a movable truck structure, a polyphase interlocked circuit breaker mounted on the truck structure, contact members on the cell structure for establishing a circuit through the circuit breaker when the truck structure is in closed position, a separately operable disconnecting switch for each phase of the circuit breaker mounted on the cell structure and a separately operative disconnecting switch mechanism for each phase mounted on the truck structure for selectively isolating a portion of the said circuit.

6. The combination with a support having a plurality of contact members thereon of a truck structure having a circuit breaker and contact members for engaging the first contact members for establishing a circuit through the circuit breaker when the first and second contact members are in engagement, one of the said second contact members being movable with respect to the truck whereby it may be withheld from engagement with its respective first contact member when the other first and second contact members are in engagement.

7. The combination with a support having a plurality of contact members thereon of a truck structure having a circuit breaker and contact members for engaging the first contact members for establishing a circuit through the circuit breaker when the first and second contact members are in engagement, one of the said second contact members being movable with respect to the truck whereby it may be withdrawn from engagement with its respective first contact member when the other first and second contact members are in engagement, and a bridging switch on the truck structure for connecting two of the said second contact members.

In testimony whereof, I have hereunto subscribed my name this 27th day of June, 1923.

KARL C. RANDALL.